US012734733B2

(12) United States Patent
Satoh

(10) Patent No.: US 12,734,733 B2
(45) Date of Patent: Sep. 15, 2026

(54) METHOD FOR PRODUCING MODIFIED CONJUGATED DIENE POLYMER LATEX

(71) Applicant: ZEON CORPORATION, Tokyo (JP)

(72) Inventor: Yoshitaka Satoh, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 556 days.

(21) Appl. No.: 18/275,528

(22) PCT Filed: Feb. 15, 2022

(86) PCT No.: PCT/JP2022/005910

§ 371 (c)(1),
(2) Date: Aug. 2, 2023

(87) PCT Pub. No.: WO2022/181389

PCT Pub. Date: Sep. 1, 2022

(65) Prior Publication Data

US 2024/0101723 A1 Mar. 28, 2024

(30) Foreign Application Priority Data

Feb. 25, 2021 (JP) ................................ 2021-028546

(51) Int. Cl.
*C08C 19/00* (2006.01)
*C08J 5/02* (2006.01)

(52) U.S. Cl.
CPC ................ *C08C 19/00* (2013.01); *C08J 5/02* (2013.01); *C08J 2309/10* (2013.01)

(58) Field of Classification Search
CPC ... C08F 6/24; C08F 6/26; C08F 279/02; C08J 2309/10; C08J 5/02; B29L 2031/4864; B29K 2009/00; B29K 2105/0064
See application file for complete search history.

(56) References Cited

U.S. PATENT DOCUMENTS

2009/0162679 A1 6/2009 Asami et al.
2021/0040246 A1* 2/2021 Satoh ...................... C08L 15/00
2021/0332224 A1 10/2021 Hayashi et al.

FOREIGN PATENT DOCUMENTS

JP -04-218549 A 8/1992
JP H04218549 A * 8/1992
JP 2012-132015 A 7/2012
WO WO-2019171981 A1 * 9/2019 ............ C08F 279/02
WO 2020/054247 A1 3/2020

OTHER PUBLICATIONS

JPH04218549 Global Dossier English translation, prepared Feb. 20, 2026. (Year: 2026).*
Aug. 29, 2023 International Preliminary Report on Patentability issued in International Patent Application No. PCT/JP2022/005910.
May 10, 2022 International Search Report issued in International Patent Application No. PCT/JP2022/005910.
Nov. 15, 2024 Extended European Search Report issued in European Patent Application No. 22759428.0.
Jun. 3, 2026 Office Action issued in Singaporean Patent Application No. 11202306156V.

* cited by examiner

*Primary Examiner* — Christopher M Rodd
(74) *Attorney, Agent, or Firm* — Oliff PLC

(57) ABSTRACT

A method for producing a modified conjugated diene polymer latex, includes: a modification step of obtaining a modified conjugated diene polymer by contacting a conjugated diene polymer with a radical generator; and an emulsification step of emulsifying the modified conjugated diene polymer in water, wherein the modification step includes modifying the conjugated diene polymer on a condition where the total amount of an organic solvent and water used is 20 parts by weight or less with respect to 100 parts by weight of the conjugated diene polymer.

9 Claims, No Drawings

METHOD FOR PRODUCING MODIFIED CONJUGATED DIENE POLYMER LATEX

TECHNICAL FIELD

The present invention relates to a method for producing a modified conjugated diene polymer latex.

BACKGROUND ART

Conventionally, it has been known that dip-molded articles (e.g., teats, balloons, gloves, balloons, and stalls) used in contact with the human body can be obtained by dip molding a latex composition containing natural rubber latex. However, in some cases, such dip-molded articles are not suitable for use in direct contact with the mucosa or organs of living bodies because the natural rubber latex contains proteins that may cause immediate (Type I) allergic reactions in human bodies. In response to this problem, use of a synthetic rubber latex instead of natural rubber latex has been studied.

For example, Patent Document 1 discloses a latex containing an acid-modified conjugated diene polymer formed by modifying a conjugated diene polymer with an acid group-containing compound, wherein the content of a structural unit derived from the acid group-containing compound is 0.2 to 0.7 parts by weight in 100 parts by weight of the acid-modified conjugated diene polymer, the content of a water-soluble polymer in the latex is 2 parts by weight or less with respect to 100 parts by weight of the acid-modified conjugated diene polymer, and the viscosity when the solids content is 50 wt % and the viscosity when the solids content is 60 wt % are in specific ranges.

RELATED ART DOCUMENT

Patent Document

Patent Document 1: WO 2019/171981

SUMMARY OF THE INVENTION

Problem to be Solved by the Invention

However, in the above-described technique of Patent Document 1, since a conjugated diene polymer is modified with an acid group-containing compound in the solution which is obtained by dissolving the conjugated diene polymer in an organic solvent, it requires dissolution in the organic solvent and removal of the organic solvent. This has been demanded to be improved from the viewpoint of raising productivity. Also, further lowering of the viscosity has been demanded from the viewpoint of improving handling properties of the latex, although in the above-described technique of Patent Document 1, the viscosity when the solids content is 50 wt % and the viscosity when the solids content is 60 wt % can be reduced to specific ranges.

The present invention is completed in view of solving the problems above. An objective of the present invention is to provide a highly productive method for producing a modified conjugated diene polymer latex that has excellent handling properties and that can provide a molded film, such as a dip-molded article, having high tensile strength and tear strength.

Means for Solving the Problems

As a result of dedicated research to solve the aforementioned objective, the present inventor has found that the problems can be solved by employing a method in which a modified conjugated diene polymer is obtained by contacting a conjugated diene polymer with a radical generator on a condition where the total amount of an organic solvent and water used is a certain amount or less, and then the modified conjugated diene polymer obtained is emulsified in water. Based on such findings, the present inventor has accomplished the present invention.

That is, the present invention provides a method for producing a modified conjugated diene polymer latex, comprising:

a modification step of obtaining a modified conjugated diene polymer by contacting a conjugated diene polymer with a radical generator; and an emulsification step of emulsifying the modified conjugated diene polymer in water;

wherein the modification step comprises modifying the conjugated diene polymer on a condition where the total amount of an organic solvent and water used is 20 parts by weight or less with respect to 100 parts by weight of the conjugated diene polymer.

In the method for producing a modified conjugated diene polymer latex according to the present invention, the modification step preferably comprises contacting the conjugated diene copolymer with the radical generator by adding the radical generator to the conjugated diene polymer, and kneading the mixture.

In the method for producing a modified conjugated diene polymer latex according to the present invention, the modification step preferably comprises contacting the conjugated diene copolymer in a solid form with the radical generator.

In the method for producing a modified conjugated diene polymer latex according to the present invention, in the emulsification step, the emulsification of the modified conjugated diene polymer in water is preferably performed using alkaline water.

In the method for producing a modified conjugated diene polymer latex according to the present invention, in the emulsification step, the emulsification of the modified conjugated diene polymer in water is preferably performed using 0.01 to 5 parts by weight of a surfactant with respect to 100 parts by weight of the modified conjugated diene polymer.

In the method for producing a modified conjugated diene polymer latex according to the present invention, in the modification step, the modified conjugated diene polymer is preferably obtained by contacting the conjugated diene polymer with the radical generator in the presence of an acid group-containing compound and/or an acid anhydride.

In the method for producing a modified conjugated diene polymer latex according to the present invention, in the modification step, the acid group-containing compound and/or the acid anhydride is preferably used in the amount of 0.5 to 15 parts by weight with respect to 100 parts by weight of the conjugated diene polymer.

In the method for producing a modified conjugated diene polymer latex according to the present invention, the conjugated diene polymer is preferably a synthetic polyisoprene.

The present invention also provides a method for producing a latex composition comprising steps of obtaining a modified conjugated diene polymer latex by the above-described method; and adding a sulfur-based vulcanizing agent to the modified conjugated diene polymer latex.

The present invention further provides a method for producing a dip-molded article comprising steps of obtaining a latex composition by the above-described method; and dip molding the latex composition.

Effects of the Invention

The present invention can provide a highly productive method for producing a modified conjugated diene polymer latex that has excellent handling properties and that can provide a molded film, such as a dip-molded article, having high tensile strength and tear strength.

DESCRIPTION OF EMBODIMENTS

A method for producing a modified conjugated diene polymer latex according to the present invention comprises:

- a modification step of obtaining a modified conjugated diene polymer by contacting a conjugated diene polymer with a radical generator; and
- an emulsification step of emulsifying the modified conjugated diene polymer in water;
- wherein the modification step comprises modifying the conjugated diene polymer on a condition where the total amount of an organic solvent and water used is 20 parts by weight or less with respect to 100 parts by weight of the conjugated diene polymer.

<Conjugated Diene Polymer>

First, the conjugated diene polymer used in the present invention will be described.

Examples of the conjugated diene polymer include, but are not limited to, synthetic polyisoprenes, styrene-isoprene-styrene block copolymers (SISs), natural rubbers (including protein-free natural rubbers), and the like. The conjugated diene polymer is preferably a synthetic polyisoprene, a styrene-isoprene-styrene block copolymer (SIS), or a natural rubber (which may be a protein-free natural rubber), more preferably a synthetic polyisoprene, a styrene-isoprene-styrene block copolymer (SIS), or a protein-free natural rubber, further more preferably a synthetic polyisoprene or a styrene-isoprene-styrene block copolymer (SIS), particularly preferably a synthetic polyisoprene.

The synthetic polyisoprene can be obtained by a conventionally known method such as solution polymerization of isoprene optionally with a different ethylenically unsaturated copolymerizable monomer in an inert polymerization solvent using a Ziegler polymerization catalyst composed of trialkylaluminum-titanium tetrachloride or an alkyl lithium polymerization catalyst such as n-butyllithium or sec-butyllithium. The polymer solution of synthetic polyisoprene obtained by the solution polymerization is subjected to a coagulation procedure, and synthetic polyisoprene in a solid form can be obtained. In the case where the polymer solution of the synthetic polyisoprene is prepared by the above-described method, impurities including residual polymerization catalyst in the polymer solution may be removed. Alternatively, commercially available solid synthetic polyisoprene may be used.

There are the following four types of isoprene units in the synthetic polyisoprene which differ in bonding geometry of isoprene units: cis bond unit, trans bond unit, 1,2-vinyl bond unit, and 3,4-vinyl bond unit. In order to obtain a molded film, such as a dip-molded article, having enhanced tensile strength, the content of cis bond units among the isoprene units contained in the synthetic polyisoprene is preferably 70 wt % or more, more preferably 90 wt % or more, further more preferably 95 wt % or more with respect to the total isoprene units.

The weight average molecular weight of the synthetic polyisoprene is preferably 10,000 to 5,000,000, more preferably 500,000 to 5,000,000, further more preferably 800,000 to 3,000,000 as calibrated relative to polystyrene standards by gel permeation chromatography. Adjusting the weight average molecular weight of the synthetic polyisoprene within the above ranges can result in a molded film, such as a dip-molded article, having mechanical strength which is less likely to decrease when it is stored at a high temperature, and tends to facilitate the production of the synthetic polyisoprene latex.

The polymer Mooney viscosity (ML1+4, 100° C.) of the synthetic polyisoprene is preferably 50 to 85, more preferably 60 to 85, further more preferably 70 to 85.

As described above, the conjugated diene polymer may be a styrene-isoprene-styrene block copolymer (SIS). In the term SIS, "S" represents a styrene block, and "I" represents an isoprene block.

The SIS can be prepared by a conventionally known method such as block copolymerization of isoprene and styrene in an inert polymerization solvent using an active organic metal such as n-butyllithium as an initiator. The polymer solution of SIS obtained by the solution polymerization is subjected to a coagulation procedure, and a solid can be obtained. In the case where the polymer solution of SIS is prepared by the above-mentioned method, impurities including residual polymerization catalyst in the polymer solution may be removed. Alternatively, commercially available solid SIS may be used.

The content of styrene units in styrene blocks of the SIS contained in the SIS latex is preferably 70 to 100 wt %, more preferably 90 to 100 wt %, further more preferably 100 wt % with respect to the total monomer units. Further, the content of isoprene units in the isoprene block of the SIS is preferably 70 to 100 wt %, more preferably 90 to 100 wt %, further more preferably 100 wt % with respect to the total monomer units.

The content ratio of styrene units to isoprene units in the SIS is typically in the range of 1:99 to 90:10, preferably 3:97 to 70:30, more preferably 5:95 to 50:50, further more preferably 10:90 to 30:70 as a weight ratio of "styrene units:isoprene units".

The weight average molecular weight of the SIS is preferably 10,000 to 1,000,000, more preferably 50,000 to 500,000, further more preferably 100,000 to 300,000 as calibrated relative to polystyrene standards by gel permeation chromatography. Adjusting the weight average molecular weight of the SIS within the above ranges tends to facilitate the production of the SIS latex.

The polymer Mooney viscosity (ML1+4, 100° C.) of the SIS is preferably 50 to 85, more preferably 60 to 85, further more preferably 70 to 85.

As the conjugated diene polymer, a natural rubber can be used as described above, and a protein-free natural rubber can also be used. Further, as the conjugated diene polymer, a nitrile group-containing conjugated diene copolymer, a butadiene polymer, a styrene-butadiene copolymer, or the like may be used.

<Modification Step>

The modification step of the production method according to the present invention is a step of obtaining a modified conjugated diene polymer by contacting the conjugated diene polymer described above with a radical generator.

Also, in the modification step of the production method according to the present invention, the conjugated diene polymer is modified on a condition where the total amount of the organic solvent and water used is 20 parts by weight or less with respect to 100 parts by weight of the conjugated diene polymer, and more specifically, the conjugated diene polymer is modified by contacting the conjugated diene polymer in a solid form with the radical generator.

In the modification step, contacting the conjugated diene polymer with the radical generator allows the radical generator to act on a carbon-carbon double bond contained in the conjugated diene polymer, to thereby introduce a modification group to the conjugated diene polymer, resulting in the modified conjugated diene polymer. Specifically, allowing the radical generator to act on a carbon-carbon double bond contained in the conjugated diene polymer can introduce a hydrophilic group such as a carboxyl group, resulting in a conjugated diene polymer modified with the hydrophilic group.

In the modification step, the conjugated diene polymer is contacted with the radical generator on a condition where the total amount of the organic solvent and water used is 20 parts by weight or less, preferably 5 parts by weight or less, more preferably 1 part by weight or less with respect to 100 parts by weight of the conjugated diene polymer, particularly preferably in a state where substantially no organic solvent or water is contained or the organic solvent and water are not added actively. In other words, the solid conjugated diene polymer is contacted with the radical generator in a state where substantially no volatile component is contained.

According to the present invention, adjusting the total amount of the organic solvent and water used within the above ranges, and contacting the solid conjugated diene polymer with the radical generator result in a conjugated diene polymer modified with a hydrophilic group, and further, a high introducing rate of such a modification group. Such an introduction of the modification group can reduce the amount of a surfactant when the modified conjugated diene polymer is dispersed in water to obtain the modified conjugated diene polymer latex in the emulsification step described below. As a result, the viscosity of the modified conjugated diene polymer latex obtained can be reduced, and the handling properties thereof can be enhanced. In addition, according to the present invention, the modified conjugated diene polymer obtained by the modification step can be dispersed in water in the emulsification step described below without dissolution in the organic solvent, which makes the dissolution in the organic solvent and the removal of the organic solvent unnecessary. This allows excellent productivity to be achieved, and can further provide a molded film, such as a dip-molded article, having excellent tensile strength and tear strength without the dissolution in the organic solvent and the removal thereof.

Although the method for contacting the conjugated diene polymer with the radical generator is not specifically limited, a preferred method is to add the radical generator to the conjugated diene polymer, followed by kneading of the mixture. Such a method is suitable because heat generation from the kneading can facilitate generation of a radical by the radical generator. The contact temperature when the conjugated diene polymer is contacted with the radical generator is preferably 50 to 260° C., more preferably 80 to 200° C., and the contact time is preferably 20 minutes to 2 hours, more preferably 30 minutes to one hour.

Although the radical generator is not specifically limited, a compound generating a radical by heat is preferable, and examples thereof include organic peroxides, azo compounds, and the like. For the compound generating a radical by heat, the 1-minute half-life temperature is preferably 50 to 260° C., more preferably 100 to 230° C., further more preferably 120 to 200° C. One of these radical generators may be used alone, or two or more of them may be used in combination.

Examples of organic peroxides include methyl ethyl ketone peroxide, cyclohexanone peroxide, methyl cyclohexanone peroxide, methyl acetoacetate peroxide, acetyl acetate peroxide, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-bis(t-butylperoxy)-2-methylcyclohexane, 1,1-bis(t-butylperoxy)cyclohexane, 1,1-bis(t-butylperoxy)cyclododecane, 1,1-bis(t-butylperoxy)butane, 2,2-bis(4,4-di-t-butylperoxycyclohexyl)propane, p-menthane hydroperoxide, diisopropylbenzene hydroperoxide, 1,1,3,3-tetramethylbutyl hydroperoxide, cumene hydroperoxide, t-hexyl hydroperoxide, t-butyl hydroperoxide, α,α'-bis(t-butylperoxy)diisopropylbenzene, dicumyl peroxide, 2,5-dimethyl-2,5-bis(t-butylperoxy)hexane, t-butyl cumyl peroxide, di-t-butyl peroxide, 2,5-dimethyl-2,5-bis(t-butylperoxy)hexine-3, isobutyryl peroxide, 3,5,5-trimethylhexanoyl peroxide, octanoyl peroxide, lauroyl peroxide, stearoyl peroxide, succinic acid peroxide, m-toluoylbenzoyl peroxide, benzoyl peroxide, di-n-propyl peroxydicarbonate, diisopropyl peroxydicarbonate, bis(4-t-butylcyclohexyl)peroxydicarbonate, di-2-ethoxyethyl peroxydicarbonate, di-2-ethoxyhexyl peroxydicarbonate, di-3-methoxybutyl peroxydicarbonate, di-s-butyl peroxydicarbonate, di(3-methyl-3-methoxybutyl)peroxydicarbonate, α,α'-bis(neodecanoylperoxy)diisopropylbenzene, cumyl peroxyneodecanoate, 1,1,3,3,-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 1,1,3,3-tetranethylbutylperoxy-2-ethylhexanoate, 2,5-dimethyl-2,5-bis(2-ethylhexanoylperoxy)hexanoate, 1-cyclohexyl-1-methylethylperoxy-2-ethylhexanoate, t-hexylperoxy-2-ethylhexanoate, t-butylperoxy-2-ethylhexanoate, t-hexylperoxyisopropyl monocarbonate, t-butylperoxy isobutyrate, t-butylperoxy malate, t-butylperoxy-3,5,5-trimethylhexanoate, t-butylperoxy laurate, t-butylperoxyisopropyl monocarbonate, t-butylperoxy-2-ethylhexyl monocarbonate, t-butylperoxy acetate, t-butyl perdiethyl acetate, t-butylperoxy-m-toluyl benzoate, t-butyl peroxybenzoate, bis(t-butylperoxy) isophthalate, 2,5-dimethyl-2,5-bis(m-toluylperoxy)hexane, t-hexyl peroxybenzoate, 2,5-dimethyl-2,5-bis(benzoylperoxy)hexane, t-butylperoxy allyl monocarbonate, t-butyl trimethylsilyl peroxide, 3,3',4,4'-tetra(t-butylperoxycarbonyl)benzophenone, 2,3-dimethyl-2,3-diphenylbutane, and the like.

Among these, t-butyl perdiethyl acetate, dicumyl peroxide, and 1,1,3,3-tetramethylbutyl hydroperoxide are preferable, dicumyl peroxide and 1,1,3,3-tetramethylbutyl hydroperoxide are more preferable. Examples of azo compounds include 2-phenylazo-4-methoxy-2,4-dimethylvaleronitrile, 1-[(1-cyano-1-methylethyl)azo]formanide, 1,1'-azobis(cyclohexane-1-carbonitrile), 2,2'-azobis(2-methylbutyronitrile), 2,2'-azobisisobutyronitrile, 2,2'-azobis(2,4-dimethylvaleronitrile), 2,2'-azobis(2,4-dimethyl-4-methoxyvaleronitrile), 2,2'-azobis(2-methylpropionamidine) dihydrochloride, 2,2'-azobis(2-methyl-N-phenylpropionamidine) dihydrochloride, 2,2'-azobis[N-(4-chlorophenyl)-2-methylpropionamidine] dihydrochloride, 2,2'-azobis[N-(4-hydrophenyl)-2-methylpropionamidine] dihydrochloride, 2,2'-azobis[2-methyl-N-(phenylmethyl)propionamidine] dihydrochloride, 2,2'-azobis[2-methyl-N-(2-propenyl)propionamidine] dihydrochloride, 2,2'-azobis[N-(2-hydroxyethyl)-2-methylpropionamidine] dihydrochloride, 2,2'-azobis[2-(5-methyl-2-imidazolin-2-yl)propane] dihydrochloride, 2,2'-azobis[2-(2-imidazolin-2-yl)propane] dihydrochloride, 2,2'-azobis[2-(4,5,6,7-tetrahydro-1H-1,3-diazepin-2-yl)propane] dihydrochloride, 2,2'-azobis[2-(3,4,5,6-tetrahydropyrimidin-2-yl)propane] dihydrochloride, 2,2'-azobis[2-(5-hydroxy-3,4,5,6-tetrahydropyrimidin-2-yl)propane]dihydrochloride, 2,2'-azobis{2-[1-(2-hydroxyethyl)-2-imidazolin-2-yl]propane} dihydrochloride, 2,2'-azobis[2-(2-imidazolin-2-yl)propane], 2,2'-azobis{2-methyl-N-[1,1-bis(hydroxymethyl)-2-hydroxyethyl]propionamide}, 2,2'-azobis{2-methyl-N-[1,1-bis(hydroxymethyl)ethyl]propionamide}, 2,2'-azobis[2-methyl-N-(2-hydroxyethyl)propionamide], 2,2'-azobis(2-methylpropionamide), 2,2'-azobis(2,4,4-trimethylpentane), 2,2'-azobis(2-methylpropane), dinethyl-2,2-azobis(2-methylpropionate), 4,4'-azobis(4-cyanopentanoic acid), 2,2'-azobis[2-(hydroxymethyl)propionitrile], and the like.

Among these, preferred is 2,2'-azobisisobutyronitrile.

The amount of the radical generator used in the modification step is preferably 0.02 to 5 parts by weight, more preferably 0.5 to 3 parts by weight, further more preferably 0.5 to 1 part by weight with respect to 100 parts by weight of the conjugated diene polymer. Adjusting the amount of the radical generator used within the above ranges allows the modification reaction of the conjugated diene polymer to progress sufficiently, thereby further reducing the amount of the surfactant when the modified conjugated diene polymer obtained is dispersed in water to obtain the modified conjugated diene polymer latex. This can keep the viscosity of the modified conjugated diene polymer latex obtained lower, and can further enhance the handling properties thereof.

Further in the modification step, the conjugated diene polymer is preferably contacted with the radical generator in the presence of an acid group-containing compound and/or an acid anhydride, which allows graft-reaction or graft-polymerization of the acid group-containing compound and/or the acid anhydride onto the conjugated diene polymer. As a result, the amount of the surfactant can be reduced when the modified conjugated diene polymer obtained is dispersed in water to obtain the modified conjugated diene polymer latex. This can keep the viscosity of the modified conjugated diene polymer latex obtained lower, and can further enhance the handling properties thereof.

Examples of the acid group-containing compound include, but not limited to, carboxyl group-containing compounds, sulfonic acid group-containing compounds, phosphoric acid group-containing compounds, and the like. From the viewpoint of obtaining a molded film, such as a dip-molded article, having further enhanced tensile strength and tear strength, preferred are carboxyl group-containing compounds. Specific examples of the carboxyl group-containing compound include ethylenically unsaturated monocarboxylic acids such as acrylic acid and methacrylic acid; ethylenically unsaturated polyvalent carboxylic acids such as itaconic acid, maleic acid, and fumaric acid; ethylenically unsaturated polyvalent carboxylic acid anhydrides such as maleic anhydride and citraconic anhydride; ethylenically unsaturated polyvalent carboxylic acid partial esters such as monobutyl fumarate, monobutyl maleate, and mono-2-hydroxypropyl maleate; and the like.

Preferred acid anhydrides are carboxylic acid anhydrides. Examples thereof include ethylenically unsaturated polyvalent carboxylic acid anhydrides such as maleic anhydride and citraconic anhydride; and the like.

Among these acid group-containing compounds and acid anhydrides, preferred are ethylenically unsaturated monocarboxylic acids and ethylenically unsaturated polyvalent carboxylic acid anhydrides, preferred are acrylic acid, methacrylic acid, and maleic anhydride, and particularly preferred are methacrylic acid and maleic anhydride.

The amount of the acid group-containing compound and/or the acid anhydride used is preferably 0.5 to 15 parts by weight, more preferably 5 to 10 parts by weight with respect to 100 parts by weight of the conjugated diene polymer. Adjusting the amount of the acid group-containing compound and/or the acid anhydride used within the above ranges allows the amount of the surfactant to be reduced when the modified conjugated diene polymer obtained is dispersed in water to obtain the modified conjugated diene polymer latex. This can keep the viscosity of the modified conjugated diene polymer latex obtained lower, and can further enhance the handling properties thereof.

In the modification step, in addition to the acid group-containing compound and/or the acid anhydride, a different ethylenically unsaturated compound capable of reacting with these compounds may also be used. Examples of such an ethylenically unsaturated compound include conjugated dienes such as 1,3-butadiene, isoprene, 2,3-dimethyl-1,3-butadiene, 1,3-pentadiene, 2-methyl-3-ethyl-1,3-butadiene, 2-methyl-1,3-pentadiene, 1,3-hexadiene, and 1,3-cyclohexadiene; aromatic vinyl compounds such as styrene, α-methylstyrene, o-methylstyrene, m-methylstyrene, p-methylstyrene, 2,4-dimethylstyrene, ethylstyrene, and p-tert-butylstyrene; α,β-unsaturated nitriles such as acrylonitrile and methacrylonitrile; unsaturated carboxylic acid esters such as methyl methacrylate, ethyl acrylate, and butyl acrylate; non-conjugated dienes such as 1,5-hexadiene, 1,6-heptadiene, 1,7-octadiene, dicyclopentadiene, and 5-ethylidene-2-norbornene; and the like.

The amount of such a different ethylenically unsaturated compound used is preferably 0.1 to 10 parts by weight, more preferably 2 to 5 parts by weight with respect to 100 parts by weight of the conjugated diene polymer.

Further, in the modification step, when the conjugated diene polymer is contacted with the radical generator, a defoamer, a preservative, a chelating agent, an oxygen scavenger, a dispersant, inorganic particles, and the like may be added.

<Emulsification Step>

The emulsification step of the production method according to the present invention is a step of obtaining a modified conjugated diene polymer latex by emulsifying, in water, the modified conjugated diene polymer obtained in the modification step described above.

In the emulsification step, although it is sufficient that the modified conjugated diene polymer obtained in the modification step is emulsified in water using an emulsifying apparatus, from the viewpoint of improving the production efficiency, a method is preferably employed in which the modified conjugated diene polymer obtained in the modification step undergoes a grinding treatment in water beforehand, and the slurry containing the modified conjugated diene polymer ground is fed to the emulsifying apparatus to obtain the modified conjugated diene polymer latex.

Any grinding apparatus can be used for the grinding treatment without limitation, and it is an apparatus that can grind the modified conjugated diene polymer into an average particle size of preferably about 0.1 to 1 mm in preparation of the slurry containing the modified conjugated diene polymer ground by the grinding treatment. Although as such a grinding apparatus, a mixer pump, a crusher pump, a crushing pump, or the like can be used, preferred are a crusher pump and a crushing pump, and more preferred is a crusher pump. Examples of the crushing apparatus include "High Shear In-Line Mixer" (trade name, available from Silverson), "Disintegrator" (trade name, available from Husqvarna Zenoah Co. Ltd.), "Incrusher" (trade name, available from AIKAWA Iron Works Co., Ltd.), "MILDER" (trade name, available from Pacific Machinery & Engineering Co., Ltd.), and the like. The conditions for the grinding treatment using such a grinding apparatus are not particularly limited, and the treatment temperature, the treatment time, and the like may be appropriately selected to ensure a desired ground state. Before the grinding treatment is performed, the modified conjugated diene polymer may be cut into a predetermined size suitable for grinding beforehand, and the modified conjugated diene polymer thus cut may be used.

When the modified conjugated diene polymer obtained in the modification step is ground in water, alkaline water is preferably used. By using alkaline water, the hydrophilicity of a hydrophilic group such as a carboxyl group contained in the modified conjugated diene polymer can be improved, and thereby the modified conjugated diene polymer latex can be prepared more properly in the emulsification step. In this case, the pH of the aqueous phase before contacting with the modified conjugated diene polymer is preferably in the range of 8 to 13, more preferably 10 to 12. Examples of pH adjusters include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; organic amine compounds such as trimethylamine and triethanolamine; and the like. Preferred are alkali metal hydroxides and ammonia.

When the modified conjugated diene polymer obtained in the modification step is ground in water, the surfactant may be used. The amount of the surfactant used is preferably 0.01 to 5 parts by weight, more preferably 0.1 to 3 parts by weight, further more preferably 0.5 to 1 part by weight with respect to 100 parts by weight of the modified conjugated diene polymer. According to the production method according to the present invention, since the modified conjugated diene polymer is prepared by contacting the conjugated diene polymer with the radical generator in the modification step described above, the emulsification following the grinding treatment can be properly performed even when the amount of the surfactant used is relatively low as described above.

As the surfactant, an ionic surfactant is preferably used. In particular, an anionic surfactant is more preferably used. Examples of the anionic surfactant used include fatty acid salts such as sodium laurate, potassium myristate, sodium palmitate, potassium oleate, sodium linolenate, sodium rosinate, and potassium rosinate; alkylbenzene sulfonates such as sodium dodecylbenzenesulfonate, potassium dodecylbenzenesulfonate, sodium decylbenzenesulfonate, potassium decylbenzenesulfonate, sodium cetylbenzenesulfonate, and potassium cetylbenzenesulfonate; alkyl sulfosuccinates such as sodium di(2-ethylhexyl) sulfosuccinate, potassium di(2-ethylhexyl) sulfosuccinate, and sodium dioctyl sulfosuccinate; alkyl sulfate ester salts such as sodium lauryl sulfate and potassium lauryl sulfate; polyoxyethylene alkyl ether sulfate ester salts such as sodium polyoxyethylene lauryl ether sulfate and potassium polyoxyethylene lauryl ether sulfate; monoalkyl phosphate salts such as sodium lauryl phosphate and potassium lauryl phosphate; and the like.

Among these anionic surfactants, preferred are fatty acid salts, alkylbenzene sulfonates, alkyl sulfosuccinates, alkyl sulfate ester salts, and polyoxyethylene alkyl ether sulfate ester salts, more preferred are fatty acid salts and alkyl sulfate ester salts, and particularly preferred is a combination of fatty acid salt and alkyl sulfate ester salt. Preferred fatty acid salt is sodium rosinate, and preferred alkyl sulfate ester salt is sodium lauryl sulfate. When the combination of fatty acid salt and alkyl sulfate ester salt is used, the ratio of "fatty acid salt":"alkyl sulfate ester salt" on a weight basis is in the range of preferably 1:1 to 10:1, more preferably 1.5:1 to 4:1.

When the modified conjugated diene polymer obtained in the modification step is ground in water, the amount of water used is preferably 60 to 2000 parts by weight, more preferably 70 to 800 parts by weight, further more preferably 70 to 700 parts by weight with respect to 100 parts by weight of the modified conjugated diene polymer.

In the emulsification step, the slurry containing the modified conjugated diene polymer obtained by such a grinding treatment can be fed to the emulsifying apparatus to obtain the modified conjugated diene polymer latex. The slurry containing the modified conjugated diene polymer obtained by the grinding treatment may be fed to the emulsifying apparatus as it is. In this case, the pH of water used for emulsification, the type and amount of the surfactant, and the amount of water are the same as those in the grinding treatment. The slurry containing the modified conjugated diene polymer may be fed to the emulsifying apparatus after further adjustment of the pH and further addition of the surfactant and water. In this case, these conditions are the same as the suitable ranges in the grinding treatment described above. Namely, in the emulsification step, the pH is in the range of preferably 8 to 13, more preferably 10 to 12, and the amount of the surfactant used is preferably 0.01 to 5 parts by weight, more preferably 0.1 to 3 parts by weight with respect to 100 parts by weight of the modified conjugated diene polymer. The amount of water used is preferably 60 to 2000 parts by weight, more preferably 70 to 800 parts by weight, further more preferably 70 to 700 parts by weight with respect to 100 parts by weight of the modified conjugated diene polymer.

Examples of the emulsifying apparatus include batch emulsifying machines such as "Homogenizer" (product name, manufactured by IKA Works), "POLYTRON" (product name, manufactured by Kinematica AG), and "TK AUTO-HCMO MIXER" (product name, manufactured by Tokushu Kika Kogyo Co., Ltd.); continuous emulsifying machines such as "TK PIPELINE-HOMO MIXER" (product name, manufactured by Tokushu Kika Kogyo Co., Ltd.), "Colloid mill" (product name, manufactured by Shinko Pantec Co., Ltd.), "SLASHER" (product name, manufactured by NIPPON COKE & ENGINEERING CO., LTD.), "Trigonal wet grinder" (product name, manufactured by Mitsui Miike Chemical Engineering Machinery, Co., Ltd.), "CAVITRON" (product name, manufactured by Eurotec, Ltd.), and "FINE FLOW MILL" (product name, manufactured by Pacific Machinery & Engineering Co., Ltd.); high-pressure emulsifying machines such as "Microfluidizer" (product name, manufactured by MIZUHO INDUSTRIAL CO., LTD.), "NANCMIZER" (product name, manufactured by NANOMIZER Inc.), and "APV GAULIN" (product name, manufactured by Manton-Gaulin Company); membrane emulsifying machines such as "Membrane emulsifying machine" (product name, manufactured by REICA Co., Ltd.); vibratory emulsifying machines such as "VIBRO-MIXER" (product name, manufactured by REICA Co., Ltd.); ultrasonic emulsifying machines such as "Ultrasonic homogenizer" (product name, manufactured by Branson Ultrasonics Corporation); and the like. The conditions for the emulsification process using such an emulsifying apparatus are not particularly limited, and the treatment temperature, the treatment time, and the like may be appropriately selected to ensure a desired dispersion state.

In the production method according to the present invention, in order to increase the solids content of the modified conjugated diene polymer latex, the modified conjugated diene polymer latex obtained by the emulsification step may be subjected to a concentration process by vacuum distillation, normal pressure distillation, centrifugation, membrane concentration, or the like as needed. Among these, the concentration process is preferably performed by centrifugation.

The centrifugation is preferably performed, for example, using a continuous centrifuge under the conditions in which the centrifugal force is preferably 100 to 10,000 G, the solids content of the modified conjugated diene polymer latex before centrifugation is preferably 2 to 15 wt %, the feed flow rate into the centrifuge is preferably 500 to 1700 Kg/hr, and the back pressure (gauge pressure) of the centrifuge is preferably 0.03 to 1.6 MPa. The modified conjugated diene polymer latex can be obtained as a light liquid after the centrifugation.

The solids content of the modified conjugated diene polymer latex is preferably 45 to 70 wt %, more preferably 50 to 70 wt %. According to the production method according to the present invention, since the amount of the surfactant contained in the modified conjugated diene polymer latex can be reduced, even when the solids content is relatively high as the above ranges, the viscosity can be kept low, leading to excellent handling properties in the case of transfer through a pipe and the like.

The volume average particle size of the modified conjugated diene polymer latex is preferably 0.1 to 10 μm, more preferably 0.5 to 3 μm, further more preferably 0.5 to 2.0 μm. Adjusting this volume average particle size within the above ranges leads to an appropriate viscosity of the latex, and can suppress formation of a film on the surface of the modified conjugated diene polymer latex during storage of the latex. The volume average particle size can be measured using a laser diffraction particle size distribution measuring apparatus.

The modified conjugated diene polymer latex may contain additives that are typically used in the field of latex, such as a defoamer, a preservative, a chelating agent, an oxygen scavenger, and a dispersant.

<Latex Composition>

The latex composition according to the present invention contains the modified conjugated diene polymer latex obtained by the production method according to the present invention described above and a sulfur-based vulcanizing agent.

Examples of the sulfur-based vulcanizing agent include, but are not limited to, sulfur such as powder sulfur, flowers of sulfur, precipitated sulfur, colloidal sulfur, surface-treated sulfur, and insoluble sulfur; sulfur-containing compounds such as sulfur chloride, sulfur dichloride, morpholine disulfide, alkyl phenol disulfides, caprolactam disulfide (N,N'-dithio-bis(hexahydro-2H-azepinone-2)), phosphorus-containing polysulfides, polymer polysulfides, and 2-(4'-morpholinodithio)benzothiazole; and the like. Among these, sulfur can be preferably used. One of these sulfur-based vulcanizing agents may be used alone, or two or more of them may be used in combination.

Although the content of the sulfur-based vulcanizing agent in the latex composition is not specifically limited, it is typically 0.1 to 10 parts by weight, preferably 0.01 to 3 parts by weight, more preferably 0.2 to 2 parts by weight, further more preferably 0.3 to 1 part by weight with respect to 100 parts by weight of the modified conjugated diene polymer contained in the latex composition. Adjusting the content of the sulfur-based vulcanizing agent within the above ranges can result in a molded film, such as a dip-molded article, which can avoid delayed (Type IV) allergic reactions while having enhanced tensile strength and tear strength.

The latex composition according to the present invention preferably further contains a vulcanization accelerator. As the vulcanization accelerator, a xanthogen compound is preferably used from the viewpoint of producing a molded film, such as a dip-molded article, which can suitably avoid delayed (Type IV) allergic reactions.

Although the xanthogen compound is not specifically limited, examples thereof include xanthic acids, xanthates, xanthogen disulfides (compounds with two xanthic acid molecules bound via two sulfur atoms or the like), xanthogen polysulfides (compounds with two xanthic acid molecules bound via three or more sulfur atoms or the like), and the like.

Such xanthates are not specifically limited, and may be any compounds having a xanthic acid structure. Examples thereof include compounds represented by the general formula (ROC(=S)S)x-Z (where R represents a linear or branched hydrocarbon, Z represents a metal atom, and x represents a numerical value that matches the valence of Z and is generally 1 to 4, preferably 2 to 4, particularly preferably 2).

Although xanthates represented by the general formula (ROC(=S)S)x-Z are not specifically limited, examples thereof include zinc dimethyl xanthate, zinc diethyl xanthate, zinc dipropyl xanthate, zinc diisopropyl xanthate, zinc dibutyl xanthate, zinc dipentyl xanthate, zinc dihexyl xanthate, zinc diheptyl xanthate, zinc dioctyl xanthate, zinc di(2-ethylhexyl) xanthate, zinc didecyl xanthate, zinc didodecyl xanthate, potassium dimethyl xanthate, potassium ethyl xanthate, potassium propyl xanthate, potassium isopropyl xanthate, potassium butyl xanthate, potassium pentyl xanthate, potassium hexyl xanthate, potassium heptyl xanthate, potassium octyl xanthate, potassium 2-ethylhexyl xanthate, potassium decyl xanthate, potassium dodecyl xanthate, sodium methyl xanthate, sodium ethyl xanthate, sodium propyl xanthate, sodium isopropyl xanthate, sodium butyl xanthate, sodium pentyl xanthate, sodium hexyl xanthate, sodium heptyl xanthate, sodium octyl xanthate, sodium 2-ethylhexyl xanthate, sodium decyl xanthate, sodium dodecyl xanthate, and the like. Among these, xanthates with x in the general formula (ROC(=S)S)x-Z being 2 or more are preferable, isopropyl xanthates and butyl xanthates are more preferable, and zinc diisopropyl xanthate and zinc dibutyl xanthate are particularly preferable. One of these xanthates may be used alone, or two or more of them may be used in combination.

Xanthogen disulfides are compounds with two xanthic acid molecules bound via two sulfur atoms or the like. Examples thereof include, but are not specifically limited to, dimethyl xanthogen disulfide, diethyl xanthogen disulfide, diisopropyl xanthogen disulfide, dibutyl xanthogen disulfide, dimethyl xanthogen polysulfide, diethyl xanthogen polysulfide, diisopropyl xanthogen polysulfide, dibutyl xanthogen polysulfide, and the like. Among these, diisopropyl xanthogen disulfide and dibutyl xanthogen disulfide are preferable.

Xanthogen polysulfides are compounds with two xanthic acid molecules bound via three or more sulfur atoms or the like, and examples thereof include xanthogen trisulfides with three xanthic acid molecules bound via sulfur, xanthogen tetrasulfides with four xanthic acid molecules bound via sulfur, xanthogen pentasulfides with five xanthic acid molecules bound via sulfur, and the like.

Although the latex composition may contain one of these xanthogen compounds alone, the latex composition preferably contains a combination of two or more of them. For example, in the case where the latex composition contains a xanthic acid, the latex composition may contain two or more xanthogen compounds as a result of conversion of a portion of the xanthic acid to a salt form. Alternatively, a portion of the xanthic acid mixed in the latex composition may be present in the form of a xanthogen disulfide or a xanthogen polysulfide due to the action of the sulfur-based vulcanizing agent mixed in the latex composition. Likewise, also in the case where the latex composition contains a xanthate, a xanthogen disulfide, or a xanthogen polysulfide, these each may be present in the form of any one of a xanthic acid, a xanthate, a xanthogen disulfide, and a xanthogen polysulfide.

Further, in the present invention, a vulcanization accelerator other than xanthogen compounds may be used in place of the xanthogen compound or together with the xanthogen compound.

As such vulcanization accelerators other than xanthogen compounds, vulcanization accelerators conventionally used in film molding such as dip molding can be used. Examples thereof include dithiocarbamic acid compounds, such as diethyldithiocarbamic acid, dibutyldithiocarbamic acid, di-2-ethylhexyldithiocarbamic acid, dicyclohexyldithiocarbamic acid, diphenyldithiocarbamic acid, and dibenzyldithiocarbamic acid, and zinc salts thereof; 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthiocarbaylthio)benzothiazole, 2-(2,6-dimethyl-4-morpholinothio)benzothiazole, 2-(4'-morpholinodithio)benzothiazole, 4-morpholinyl-2-benzothiazyl disulfide, 1,3-bis(2-benzothiazyl mercaptomethyl)urea, and the like. One of these vulcanization accelerators may be used alone, or two or more of them may be used in combination.

The content of the vulcanization accelerator (in the case where multiple vulcanization accelerators are present, the total content thereof) in the latex composition is preferably 0.01 to 10 parts by weight, more preferably 0.1 to 7 parts by weight, further more preferably 0.5 to 5 parts by weight with respect to 100 parts by weight of the modified conjugated diene polymer contained in the latex composition. Adjusting the content of the vulcanization accelerator within the above ranges can result in a molded film, such as a dip-molded article, having further improved tensile strength and tear strength.

In the case where the latex composition according to the present invention contains the xanthogen compound as the vulcanization accelerator, the latex composition according to the present invention may further contain an activating agent.

In the case where the molded film, such as a dip-molded article, obtained from the latex composition comprising the activating agent is cross-linked, the activating agent as well as the xanthogen compound described above acts as a vulcanization accelerator, allowing the molded film, such as a dip-molded article, to have enhanced tear strength.

Although such an activating agent is not particularly limited, a metal compound is preferably used to further enhance the tear strength of the molded film, such as a dip-molded article. Examples of such metal compounds include, but are not limited to, metal oxides, metal compounds having one or more carbon atoms, and the like. Any metal may be selected as a metal component of such metal compounds without limitation. Preferred is a typical metal (at least one element selected from the group consisting of the elements of Groups 1, 2, 12, 13, 14, 15, 16, 17, and 18). More preferred are the elements of Groups 2, 12, 13, and 14, further more preferred are zinc, magnesium, calcium, aluminum, and lead, particularly preferred are zinc, magnesium, and calcium, and most preferred is zinc. One of these metal compounds may be used alone, or two or more of them may be used in combination.

Although metal oxides are not particularly limited, zinc oxide, magnesium oxide, titanium oxide, calcium oxide, lead oxide, iron oxide, copper oxide, tin oxide, nickel oxide, chromium oxide, cobalt oxide, and aluminum oxide are preferred from the viewpoint of providing a molded film, such as a dip-molded article, having further enhanced tear strength. More preferred is zinc oxide.

Preferred metal compounds having one or more carbon atoms are carbonates, hydrogen carbonates, hydroxides, and organic metal compounds from the viewpoint of providing a molded film, such as a dip-molded article, having further enhanced tear strength. More preferred are carbonates, hydrogen carbonates, and organic metal compounds. Among these, inorganic salts such as carbonates and hydrogen carbonates are particularly preferred from the viewpoint of high stability and high availability of the compounds.

The content of the activating agent in the latex composition is preferably 0.01 to 10 parts by weight, more preferably 0.1 to 5 parts by weight, further more preferably 1 to 3 parts by weight with respect to 100 parts by weight of the modified conjugated diene polymer contained in the latex composition.

The latex composition can further contain optional compounding agents including antioxidants; dispersants; activating agents; reinforcers such as carbon black, silica, and talc; fillers such as calcium carbonate and clay; ultraviolet absorbers; and plasticizers.

These compounding agents can be mixed in the latex composition by any method without limitation. Examples thereof include a method involving preparing a composition containing the modified conjugated diene polymer latex, the sulfur-based vulcanizing agent, and the vulcanization accelerator, and then mixing the optional compounding agents with the prepared composition using a disperser such as a ball mill, a kneader, or a disperser, and the like. Some of the compounding agents may be added after aging (described later).

The latex composition according to the present invention is preferably subjected to aging (pre-vulcanization) before being molded from the viewpoint of producing a molded film, such as a dip-molded article, having sufficient mechanical properties. The time for aging (pre-vulcanization) is preferably 8 to 120 hours, more preferably 24 to 72 hours, although not particularly limited thereto. The temperature during aging (pre-vulcanization) is preferably 20 to 40° C., although not particularly limited thereto. After a predetermined time of aging (pre-vulcanization) before use, the aforementioned latex composition may be successively subjected to molding such as dip molding while the conditions for aging (pre-vulcanization) are maintained (the aging (pre-vulcanization) is continued). In this case, the aging (pre-vulcanization) time and the aging (pre-vulcanization) temperature may be controlled within the above ranges.

<Dip-Molded Article>

The dip-molded article according to the present invention is a molded film that can be obtained by dip molding the latex composition according to the present invention described above. The dip molding is a method involving immersing a mold in the latex composition to deposit the composition on the surface of the mold, then pulling the mold out of the composition, and thereafter drying the composition deposited on the surface of the mold. The mold before the immersion in the latex composition may be preheated. Further, before the mold is immersed in the latex composition or after the mold is pulled out of the latex composition, a coagulant can be used as required.

Specific examples of how to use the coagulant include depositing the coagulant on the mold by immersing the mold in a coagulant solution before the immersion in the latex composition (anode coagulant dipping); immersing the mold on which the latex composition has been deposited in a coagulant solution (Teague coagulant dipping); and the like. The anode coagulant dipping is preferable in that a dip-molded article is obtained with less thickness unevenness.

Specific examples of coagulants include water-soluble polyvalent metal salts including metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; and sulfates such as calcium sulfate, magnesium sulfate, and aluminum sulfate. Among these, calcium salts are preferable, and calcium nitrate is more preferable. One of these water-soluble polyvalent metal salts may be used alone, or two or more of them may be used in combination.

Such coagulants can be generally used as solutions in water, an alcohol, or a mixture thereof, and are preferably used in the form of aqueous solutions. Such aqueous solutions may further contain a water-soluble organic solvent such as methanol or ethanol, and a nonionic surfactant. Although the concentration of coagulant(s) varies depending on the type of the water-soluble polyvalent metal salt, the concentration is preferably 5 to 50 wt %, more preferably 10 to 30 wt %.

The mold after pulled out of the latex composition is generally heated to dry the deposit formed on the mold. The drying conditions may be appropriately selected.

Next, the dip-molded layer deposited on the mold is cross-linked by heating. The dip-molded layer can be cross-linked by heat treatment typically at a temperature of 80 to 150° C., preferably for 10 to 130 minutes. As a heating method, external heating methods by infrared rays or heated air or internal heating methods by high-frequency waves can be used. Among these, external heating by heated air is preferable. Before the heat treatment, the dip-molded layer may be immersed in water, preferably hot water at 30 to 70° C. for about 1 to 60 minutes to remove water-soluble impurities (such as excess emulsifier and coagulant). Although the removal of water-soluble impurities may be performed after the heat treatment of the dip-molded layer, the removal process is preferably performed before the heat treatment to remove the water-soluble impurities more efficiently.

Then, a dip-molded article is obtained by detaching the dip-molded layer from the mold for dip molding. As a detaching method, a method of peeling the layer from the mold by hand or a method of peeling the layer by water pressure or pressure of compressed air can be employed. After the detachment, heat treatment at a temperature of 60 to 120° C. for 10 to 120 minutes may be further performed.

The film thickness of the dip-molded article is preferably 0.03 to 0.50 mm, more preferably 0.05 to 0.40 mm, particularly preferably 0.08 to 0.30 mm.

The dip-molded article according to the present invention is obtained by using the latex composition containing the modified conjugated diene polymer latex obtained by the production method according to the present invention described above, and therefore has high tear strength and tensile strength. For this reason, the dip-molded article according to the present invention can be used particularly suitably as a glove, for example. In the case where the dip-molded article is a glove, inorganic fine particles made of talc, calcium carbonate, or the like or organic fine particles such as starch particles may be spread on the surface of the glove, an elastomer layer containing fine particles may be formed on the surface of the glove, or the surface layer of the glove may be chlorinated in order to prevent the adhesion of contacting parts of the dip-molded article and allow the glove to be put on and taken off more smoothly.

Further, other than the aforementioned glove, the dip-molded article according to the present invention can be used as medical supplies such as baby bottle nipples, droppers, tubes, water pillows, balloon stalls, catheters, and condoms; toys such as balloons, dolls, and balls; industrial supplies such as pressure molding bags and gas storage bags; fingerstalls; and the like.

EXAMPLES

Hereinafter, the present invention will be specifically described with reference to Examples. However, the present invention is not limited to these examples. The “part(s)” below is on a weight basis unless otherwise specified. The physical properties were measured as follows.

<Solids Content>

From each sample, 2 g (weight: X2) was accurately weighed on an aluminum dish (weight: X1), followed by drying in a hot air dryer at 105° C. for 2 hours. Subsequently, after cooling in a desiccator, the weight thereof (weight: X3) including the aluminum dish was measured to calculate the solids content according to the following calculation formula.

$$\text{Solids content (wt \%)}=(X3-X1)\times 100/X2$$

<Volume Average Particle Size>

The volume average particle size of polymer particles forming a latex was measured using a laser diffraction particle size distribution measuring apparatus (product name “SALD2200”, available from Shimadzu Corporation).

<Viscosities at Solids Contents of 55 wt % and 57 wt %>

The viscosity of a modified conjugated diene polymer latex at solids content of 55 wt % and the viscosity at solids content of 57 wt % were measured using a B-type viscometer (Brookfield viscometer, type: BL, manufactured by TOKYO KEIKI INC.) at 25° C. When the viscosity at solids content of 55 wt % was measured, water was added to dilute the modified conjugated diene polymer latex to a solids content of 55 wt % before the measurement.

<Swell Index (SI)>

Potassium hydroxide was added to a modified synthetic polyisoprene latex to adjust the pH to 8.2. And then, a ceramic mold having a ground surface was provided and washed, followed by preheating in an oven at 70° C. for 60 minutes. Thereafter, the ceramic mold preheated was immersed in a coagulant aqueous solution containing 18 wt % of calcium nitrate and 0.05 wt % of polyoxyethylene lauryl ether (product name "EMULGEN 109P", manufactured by Kao Corporation) for 5 seconds. The ceramic mold was taken out from the coagulant aqueous solution, and then the ceramic mold coated with the coagulant was dried in an oven at 70° C. for 20 minutes. Subsequently, the ceramic mold coated with the coagulant was taken out from the oven, and immersed in the modified synthetic polyisoprene latex having a pH adjusted to 8.2 at 25° C. for 10 seconds, and then taken out. After immersed in warm water at 60° C. for 2 minutes, the ceramic mold coated with the modified synthetic polyisoprene latex was dried at room temperature for 6 hours, resulting in the ceramic mold coated with a film for the measurement. After the ceramic mold was sprayed with talc, the resulting film was peeled from the ceramic mold to obtain a dip film having a thickness of 0.2 mm. After cutting out of the obtained film into a test film with a 25-mm diameter, immersing the resulting test film in toluene at 25° C. for one hour, and measuring the width of the test piece before and after the inmersion in toluene, the swell index (SI) was calculated according to the formula below.

Swell index (SI) [%]=[{(width of film after immersion in toluene)−(width of film before immersion in toluene)}]/(width of film before immersion in toluene)]×100

If the swell index is in the range of 120 to 140%, gelling of the modified synthetic polyisoprene is appropriately suppressed, which is suitable.

<Tensile Strength of Dip-Molded Article>

In accordance with ASTM D412, each of the dip-molded articles was punched out using a dumbbell (trade name "SUPER DUMBBELL (type: SDMK-100C)" available from DUMBBELL CO., LTD.) to produce a test piece for tensile strength measurement. The test piece was stretched at a stretching speed of 500 mm/min using a TENSILON Universal Material Testing Instrument (trade name "RTG-1210", available from ORIENTEC CORPORATION) to measure tensile strength immediately before break (unit: MPa).

<Tear Strength of Dip-Molded Article>

In accordance with ASTM D624-00, each dip-molded article was punched out using a dumbbell (trade name "Die C", available from DUMBBELL CO., LTD.) to prepare a test piece for tear strength measurement. The test piece was stretched at a stretching speed of 500 mm/min using a TENSILON Universal Material Testing Instrument (trade name "RTG-1210", available from A&D Company, Limited) to measure tear strength (unit: N/mm). A dip-molded article with a higher tear strength is considered as having higher mechanical strength.

Example 1

(Production of Modified Synthetic Polyisoprene Latex (A-1))

100 Parts of a synthetic polyisoprene (trade name "NIPOL IR2200L", available from Zeon Corporation), 5 parts of styrene, 5 parts of maleic anhydride, and 0.5 parts of azobisisobutyronitrile (AIBN) were charged into a closed Banbury set at 50° C., and the system was nitrogen-purged for 5 minutes with kneading. Subsequently, the temperature was raised to 100° C. with kneading, and kneading was performed for 30 minutes. Then, the resulting mixture was cooled, and taken out of the closed Banbury, thereby obtaining the modified synthetic polyisoprene in a solid form.

The solid modified synthetic polyisoprene obtained was then cut into an about 1-cm cube. 525 Parts of the modified synthetic polyisoprene cut and 3500 parts of a 1 wt % sodium hydroxide aqueous solution were charged into a SUS tank with a capacity of 10 L, and transferred to a crusher pump (trade name "MILDER", available from Pacific Machinery & Engineering Co., Ltd.) with stirring. The grinding treatment was then performed to obtain a slurry of the modified synthetic polyisoprene. The obtained slurry of the modified synthetic polyisoprene had an aqueous phase having a pH of 12.

The obtained slurry of modified synthetic polyisoprene (A-1) was then charged into an emulsifying apparatus (product name "CAVITRON", manufactured by Eurotec, Ltd.), and emulsified at a rotational speed of 4100 rpm to give an aqueous dispersion liquid of the modified synthetic polyisoprene. In this process, the feed flow rate of the slurry of the modified synthetic polyisoprene was controlled at 2,000 kg/hr, the temperature was controlled at 60° C., and the back pressure (gauge pressure) was controlled at 0.5 MPa.

The obtained aqueous dispersion liquid of the modified synthetic polyisoprene was concentrated by centrifugation at 8,000 to 9,000 G using a continuous centrifuge (trade name "SRG510", available from Alfa Laval AB) to give a synthetic polyisoprene latex (A-1) having a solids content of 57 wt % as a light liquid. The conditions for centrifugation were as follows: the solids content of the aqueous dispersion liquid before centrifugation was 13 wt %, the flow rate during continuous centrifugation was 1300 kg/hr, and the back pressure (gauge pressure) of the centrifuge was 0.1 MPa.

Viscosities at solids contents of 55 wt % and 57 wt % and the swell index (SI) were measured on the resulting synthetic polyisoprene latex (A-1). The results are as shown in Table 1.

(Preparation of Aqueous Dispersion Liquid of Sulfur)

0.5 Parts of sulfur, 0.03 parts (6.0 parts with respect to 100 parts of sulfur) of the sodium salt of a condensation product of β-naphthalene sulfonic acid and formalin (trade name "DEMOL T-45", available from Kao Corporation) as an anionic surfactant, 0.004 parts of a 5% potassium hydroxide aqueous solution, and 0.42 parts of water were mixed with a ball mill (trade name "porcelain ball mill" available from NITTO KAGAKU CO., Ltd.) and crushed to yield an aqueous dispersion liquid of sulfur. The mixing with the ball mill was performed using ceramic porcelain balls of φ10 mm to φ35 mm (a mixture of ceramic porcelain balls of φ10 mm, φ15 mm, φ20 mm, φ25 mm, φ30 mm, and φ35 mm) at 50 rpm for 72 hours.

(Preparation of Aqueous Dispersion Liquid of Xanthogen Compound)

2.5 Parts of zinc diisopropyl xanthate (trade name "NOCCELER ZIX", available from Ouchi Shinko Chemical Industrial Co., Ltd., volume average particle size: 14 μm, 95% volume cumulative diameter (D95):55 μm) as a xanthogen compound, 0.45 parts (18.0 parts with respect to 100 parts of zinc diisopropyl xanthate) of polyoxyethylene distyrenated phenyl ether (trade name "EMULGEN A-60", available from Kao Corporation) as a non-ionic surfactant, and 2.05 parts of water were mixed with a ball mill (trade name "porcelain ball mill" available from NITTO KAGAKU CO., LTD.) and crushed to yield an aqueous dispersion liquid of the xanthogen compound. The mixing with the ball mill was performed using ceramic porcelain balls of φ10 mm to φ35 mm (a mixture of ceramic porcelain balls of φ10 mm, φ15 mm, (φ20 mm, φ25 mm, (φ30 mm, and φ35 mm) at 50 rpm for 72 hours.

(Preparation of Latex Composition)

While the modified synthetic polyisoprene latex (A-1) obtained above was being stirred, ion exchanged water was injected to the modified synthetic polyisoprene latex (A-1) to adjust the solids content to 40 wt %. 0.5 Parts of the aqueous dispersion liquid of sulfur prepared above on a sulfur basis and 2.5 parts of the aqueous dispersion liquid of xanthogen compound on a zinc diisopropyl xanthate basis were added with respect to 100 parts of the modified synthetic polyisoprene in the modified synthetic polyisoprene latex (A-1) having the solids content adjusted.

On a solids basis with respect to 100 parts of the modified synthetic polyisoprene in the resulting mixture, 1.5 parts of zinc oxide as an activating agent and 2 parts of an antioxidant (trade name "Wingstay L", available from CHUKYO YUSHI CO., LTD) were added as aqueous dispersion liquids of the compounding agents to the mixture with stirring. Further, the mixture was aged (pre-vulcanized) for 48 hours in a temperature-constant water tank controlled at 25° C. to provide a latex composition.

(Production of Dip-Molded Article)

A commercially available ceramic hand mold (available from Shinko Ceramics Co., Ltd.) was washed, followed by preheating in an oven at 70° C. Thereafter, the hand mold was immersed in a coagulant aqueous solution containing 18 wt % of calcium nitrate and 0.05 wt % of polyoxyethylene lauryl ether (trade name "EMULGEN 109P", available from Kao Corporation) for 5 seconds, and was taken out of the coagulant aqueous solution. Subsequently, the hand mold was dried in an oven at 70° C. for 30 minutes or more, thereby allowing the coagulant to deposit on the hand mold, so that the hand mold was coated with the coagulant.

Thereafter, the hand mold coated with the coagulant was taken out of the oven, and was immersed for 10 seconds in the latex composition aged for 48 hours obtained above. Subsequently, the hand mold was air-dried at room temperature for 10 minutes, and was immersed in hot water at 60° C. for 5 minutes to elute water-soluble impurities, thereby forming a dip-molded layer on the hand mold. Thereafter, the dip-molded layer formed on the hand mold was vulcanized by heating in an oven at 130° C. for 30 minutes, followed by cooling to room temperature, and was separated from the hand mold after spreading talc to obtain a dip-molded article having a glove shape. Then, the resulting dip-molded article was measured for tensile strength and tear strength according to the aforementioned methods. The results are shown in Table 1.

Example 2

(Production of Modified Synthetic Polyisoprene Latex (A-2))

A modified synthetic polyisoprene was obtained in the same manner as Example 1 except that 10 parts of methacrylic acid was used instead of styrene and maleic anhydride, and 0.5 parts of 1,1,3,3-tetramethylbutyl hydroperoxide (product name "PEROCTA H", available from NOF CORPORATION) was used instead of azobisisobutyronitrile. A modified synthetic polyisoprene latex (A-2) having a solids content of 57 wt % was produced by the grinding treatment, emulsification, and centrifugation in the same manner as in Example 1, and likewise evaluated, except that 3500 parts of an aqueous solution prepared by dissolving sodium rosinate and sodium lauryl sulfate was used instead of the 1 wt % sodium hydroxide aqueous solution, and the slurry of the modified synthetic polyisoprene contained 0.6 parts of sodium rosinate and 0.3 parts of sodium lauryl sulfate with respect to 100 parts of the modified synthetic polyisoprene. The results are shown in Table 1.

(Preparation of Latex Composition and Production of Dip-Molded Article)

A latex composition was prepared and a dip-molded article was produced in the same manner as Example 1 except that the modified synthetic polyisoprene latex (A-2) obtained above was used, and were likewise evaluated. The results are shown in Table 1.

Example 3

(Production of Modified Synthetic Polyisoprene Latex (A-3))

A modified synthetic polyisoprene was obtained in the same manner as Example 1 except that styrene was not used, the amount of maleic anhydride used was changed to 7 parts, and 0.7 parts of dicumyl peroxide was used instead of azobisisobutyronitrile. A modified synthetic polyisoprene latex (A-3) having a solids content of 57 wt % was produced by the grinding treatment, emulsification, and centrifugation in the same manner as in Example 1, and likewise evaluated, except that 3500 parts of an aqueous solution prepared by dissolving sodium rosinate and sodium lauryl sulfate was used instead of the 1 wt % sodium hydroxide aqueous solution, and the slurry of the modified synthetic polyisoprene contained 0.6 parts of sodium rosinate and 0.3 parts of sodium lauryl sulfate with respect to 100 parts of the modified synthetic polyisoprene. The results are shown in Table 1.

(Preparation of Latex Composition and Production of Dip-Molded Article)

A latex composition was prepared and a dip-molded article was produced in the same manner as Example 1 except that the modified synthetic polyisoprene latex (A-2) obtained above was used, and were likewise evaluated. The results are shown in Table 1.

Comparative Example 1

(Production of Modified Synthetic Polyisoprene Latex (A-4))

A synthetic polyisoprene (trade name "NIPOL IR2200L", available from Zeon Corporation) was mixed with n-hexane (boiling point: 69° C.), and was dissolved therein by heating to 60° C. with stirring to prepare an n-hexane solution of the synthetic polyisoprene having a synthetic polyisoprene concentration of 15 wt %. After the n-hexane solution of the synthetic polyisoprene was transferred to the reactor, 5 parts of styrene, 5 parts of maleic anhydride, and 0.5 parts of azobisisobutyronitrile were added thereto, heated to 75° C. with stirring, and reacted at 75° C. for one hour to obtain an n-hexane solution of the modified synthetic polyisoprene.

Meanwhile, sodium lauryl sulfate was added to water, and was dissolved therein by heating to 60° C. Thus, a surfactant aqueous solution at the concentration of 1.5 wt % was prepared.

Next, the n-hexane solution of the modified synthetic polyisoprene obtained above and the surfactant aqueous solution prepared above were mixed using a mixer (trade name "Multi Line mixer MS26-MMR-5.5L", available from SATAKE CHEMICAL EQUIPMENT MFG., LTD.) in such proportions that the amount of sodium lauryl sulfate in the surfactant aqueous solution was 10 parts with respect to 100 parts of the modified synthetic polyisoprene in the n-hexane solution of the modified synthetic polyisoprene. The mixture was then mixed and emulsified at a rotational speed of 4100 rpm using an emulsifying apparatus (trade name "MILDER MDN310", available from Pacific Machinery & Engineering Co., Ltd.) to give an emulsified dispersion liquid. In this process, the total feed flow rate of the n-hexane solution of the modified synthetic polyisoprene and the surfactant aqueous solution was controlled at 2,000 kg/hr, the temperature was controlled at 60° C., and the back pressure (gauge pressure) was controlled at 0.5 MPa. In Comparative Example 1, the amount of sodium lauryl sulfate as the surfactant was 10 parts with respect to 100 parts of the modified synthetic polyisoprene. The amount of sodium lauryl sulfate used was set to 10 parts because when the amount thereof was reduced, emulsification did not proceed appropriately (in Comparative Examples 2 and 3 described below, the amount of the surfactant used was determined for the same reason).

Subsequently, the emulsified dispersion liquid obtained was heated to 80° C. under a reduced pressure of −0.01 to −0.09 MPa (gauge pressure) to distill off n-hexane and obtain an aqueous dispersion liquid of the modified synthetic polyisoprene. In this case, the liquid level at the maximum foaming increased by a factor of more than two on a volume basis relative to the liquid level at the start of distillation under reduced pressure.

After the distillation of n-hexane was completed, the aqueous dispersion liquid of the modified synthetic polyisoprene obtained was concentrated by centrifugation at 8,000 to 9,000 G using a continuous centrifuge (trade name "SRG510", available from Alfa Laval AB) to give a modified synthetic polyisoprene latex (A-4) having a solids content of 57 wt % as a light liquid. The conditions for centrifugation were as follows: the solids content of the aqueous dispersion liquid before centrifugation was 8 wt %, the flow rate during continuous centrifugation was 1300 kg/hr, and the back pressure (gauge pressure) of the centrifuge was 0.1 MPa.

The viscosities at solids contents of 55 wt % and 57 wt % and the swell index (SI) were measured on the resulting modified synthetic polyisoprene latex (A-4). The results are as shown in Table 1.

(Preparation of Latex Composition and Production of Dip-Molded Article)

A latex composition was prepared and a dip-molded article was produced in the same manner as Example 1 except that the modified synthetic polyisoprene latex (A-4) obtained above was used, and were likewise evaluated. The results are shown in Table 1.

Comparative Example 2

(Production of Modified Synthetic Polyisoprene Latex (A-5))

A synthetic polyisoprene (trade name "NIPOL IR2200L", available from Zeon Corporation) was mixed with n-hexane (boiling point: 69° C.), and was dissolved therein by heating to 60° C. with stirring to prepare an n-hexane solution of the synthetic polyisoprene having a synthetic polyisoprene concentration of 15 wt %.

Meanwhile, sodium rosinate and sodium lauryl sulfate were added to water, and were dissolved therein by heating to 60° C., Thus, an emulsifier aqueous solution of 1.5 wt % of sodium rosinate and 0.75 wt % of sodium lauryl sulfate was prepared.

Next, the n-hexane solution of the synthetic polyisoprene obtained above and the surfactant aqueous solution prepared above were mixed using a mixer (trade name "Multi Line mixer MS26-MMR-5.5L", available from SATAKE CHEMICAL EQUIPMENT MFG., LTD.) in such proportions that the amount of sodium rosinate was 10 parts and the amount of sodium lauryl sulfate was 5 parts in the surfactant aqueous solution with respect to 100 parts of the synthetic polyisoprene in the n-hexane solution of the synthetic polyisoprene. The mixture was then mixed and emulsified at a rotational speed of 4100 rpm using an emulsifying apparatus (trade name "MILDER MDN310", available from Pacific Machinery & Engineering Co., Ltd.) to give an emulsified dispersion liquid. In this process, the total feed flow rate of the n-hexane solution of the synthetic polyisoprene and the surfactant aqueous solution was controlled at 2,000 kg/hr, the temperature was controlled at 60° C., and the back pressure (gauge pressure) was controlled at 0.5 MPa.

Subsequently, the emulsified dispersion liquid was heated to 80° C. under a reduced pressure of −0.01 to −0.09 MPa (gauge pressure) to distill off n-hexane and obtain an aqueous dispersion liquid of the synthetic polyisoprene. In this case, the liquid level at the maximum foaming increased by a factor of 1.9 on a volume basis relative to the liquid level at the start of distilling off under reduced pressure.

After the distillation of n-hexane was completed, the aqueous dispersion liquid of the synthetic polyisoprene obtained was concentrated by centrifugation at 8,000 to 9,000 G using a continuous centrifuge (trade name "SRG510", available from Alfa Laval AB) to give a synthetic polyisoprene latex having a solids content of 57 wt % as a light liquid. The conditions for centrifugation were as follows: the solids content of the aqueous dispersion liquid before centrifugation was 8 wt %, the flow rate during continuous centrifugation was 1300 kg/hr, and the back pressure (gauge pressure) of the centrifuge was 0.1 MPa.

Subsequently, 130 parts of distilled water was added with respect to 100 parts of the synthetic polyisoprene in the resulting synthetic polyisoprene latex to dilute the latex. A solution of 0.8 parts (with respect to 100 parts of the synthetic polyisoprene) of the sodium salt of a condensation product of β-naphthalene sulfonic acid and formalin (trade name "DEMOL T-45", available from Kao Corporation) as a dispersant diluted with 4 parts (with respect to 100 parts of the synthetic polyisoprene) of distilled water was added to the synthetic polyisoprene latex over 5 minutes. Next, the synthetic polyisoprene latex containing the dispersant was fed into a nitrogen-purged reactor provided with a stirrer, and was warmed to 30° C. with stirring. In another reactor, a diluted solution of methacrylic acid was prepared by mixing 3 parts of methacrylic acid as a carboxyl group-containing compound and 16 parts of distilled water. The diluted solution of methacrylic acid was added over 30 minutes to the reactor controlled at 20° C.

Further, a solution composed of 7 parts of distilled water, 0.30 parts of sodium formaldehyde sulfoxylate (trade name "SFS", available from MITSUBISHI GAS CHEMICAL COMPANY, INC.), and 0.01 parts of ethylenediaminetetraacetic acid ferric sodium complex (trade name "Frost Fe", available from CHELEST CORPORATION) was prepared in another reactor. After the solution was transferred to the former reactor, 0.5 parts of 1,1,3,3-tetramethylbutyl hydroperoxide (trade name "PEROCTA H", available from NOF CORPORATION) was added thereto, followed by a reaction at 30° C. for one hour, thereby yielding a latex after the modification reaction. The resulting latex after the modification reaction was allowed to further react at 40° C. for one hour, and was concentrated in a centrifuge to yield a modified synthetic polyisoprene latex (A-5) having a solids content of 57 wt %.

The viscosities at solids contents of 55 wt % and 57 wt % and the swell index (SI) were measured on the resulting modified synthetic polyisoprene latex (A-5). The results are as shown in Table 1.

(Preparation of Latex Composition and Production of Dip-Molded Article)

A latex composition was prepared and a dip-molded article was produced in the same manner as Example 1 except that the modified synthetic polyisoprene latex (A-5) obtained above was used, and were likewise evaluated. The results are shown in Table 1.

Comparative Example 3

(Production of Modified Synthetic Polyisoprene Latex (A-6))

A modified synthetic polyisoprene latex (A-6) having a solids content of 57 wt % was produced in the same manner as in Comparative Example 2, and likewise evaluated, except that methacrylic acid (diluted solution of methacrylic acid) was not used, and as the radical generator, 0.8 parts of t-butyl peroxydiethylacetate (product name "Trigonox 27", available from KAYAKU NOURYON CORPORATION) was used instead of 1,1,3,3-tetramethylbutyl hydroperoxide. The results are shown in Table 1.

(Preparation of Latex Composition and Production of Dip-Molded Article)

A latex composition was prepared and a dip-molded article was produced in the same manner as Example 1 except that the modified synthetic polyisoprene latex (A-6) obtained above was used, and were likewise evaluated. The results are shown in Table 1.

TABLE 1

| | Modification condition of synthetic polyisoprene | | | | Emulsification step | | | |
|---|---|---|---|---|---|---|---|---|
| | | | Reactive compound | | | Surfactant | | |
| | Method of modification | Radical generator | Type | Amount used [part] | pH adjuster | Type | Amount used [part] | pH in aqueous phase |
| Example 1 | Modified in solid rubber form | Azobisisobutyronitrile | Maleic anhydride<br>Styrene | 5<br>5 | NaOH | — | — | 12 |
| Example 2 | Modified in solid rubber form | 1,1,3,3-Tetramethylbutyl hydroperoxide | Methacrylic acid | 10 | — | Sodium rosinate<br>Sodium lauryl sulfate | 0.6<br>0.3 | 11.7 |
| Example 3 | Modified in solid rubber form | Dicumyl peroxide | Maleic anhydride | 7 | NaOH | Sodium rosinate<br>Sodium lauryl sulfate | 0.6<br>0.3 | 11.7 |
| Comparative Example 1 | Modified in rubber solution form | Azobisisobutyronitrile | Maleic anhydride<br>Styrene | 5<br>5 | — | Sodium lauryl sulfate | 10 | 7.1 |
| Comparative Example 2 | Modified in latex form | 1,1,3,3-Tetramethylbutyl hydroperoxide | Methacrylic acid | 3 | — | Sodium rosinate<br>Sodium lauryl sulfate | 10<br>5 | 9.8 |
| Comparative Example 3 | Modified in latex form | t-Butyl peroxydiethylacetate | — | — | — | Sodium rosinate<br>Sodium lauryl sulfate | 10<br>5 | 9.8 |

| | | Latex | | | Dip-molded article | |
|---|---|---|---|---|---|---|
| | Organic solvent removing step Foaming ratio | Viscosity at solids content of 55 wt % [mPa · s] | Viscosity at solids content of 57 wt % [mPa · s] | Swell index | Tensile strength [MPa] | Tear strength [N/mm] |
| Example 1 | — | 30 | 110 | 138 | 25 | 36 |
| Example 2 | — | 70 | 160 | 132 | 24 | 40 |
| Example 3 | — | 55 | 140 | 127 | 22 | 35 |
| Comparative Example 1 | >2 | 120 | 220 | 160 | 22 | 24 |
| Comparative Example 2 | 1.95 | 270 | 370 | 128 | 23 | 36 |
| Comparative Example 3 | 1.9 | 155 | 235 | 130 | 21 | 34 |

As shown in Table 1, when the modified conjugated diene polymers were obtained by contacting a solid conjugated diene polymer with the radical generator, the dissolution in the organic solvent and the removal of the organic solvent were unnecessary, which leads to excellent productivity. When the modified conjugated diene polymer latices were obtained by dispersing these modified conjugated diene polymers in water, the amount of the surfactant(s) could be reduced, resulting in modified conjugated diene polymer latices having a reduced viscosity and thus having excellent handling properties. These modified conjugated diene polymer latices provided dip-molded articles having high tensile strength and tear strength (Examples 1 to 3).

On the other hand, when the modified conjugated diene polymers were obtained by modification reaction in the form of a solution in an organic solvent or modification reaction in the form of latex, the dissolution in the organic solvent and the removal of the organic solvent were necessary, and a relatively large amount of the surfactant(s) was used in the emulsification step, resulting in modified conjugated diene polymer latices having a high viscosity (Comparative Examples 1 to 3).

The invention claimed is:

1. A method for producing a latex composition, comprising:

obtaining a modified conjugated diene polymer latex by a process comprising, a modification step of obtaining a modified conjugated diene polymer by-contacting a conjugated diene polymer with a radical generator, and an emulsification step of emulsifying the modified conjugated diene polymer in water;

wherein the modification step comprises modifying the conjugated diene polymer on a condition where the total amount of an organic solvent and water used is 20 parts by weight or less with respect to 100 parts by weight of the conjugated diene polymer, and adding a sulfur-based vulcanizing agent to the modified conjugated diene polymer latex.

2. The method for producing a latex composition according to claim 1, wherein the modification step comprises contacting the conjugated diene copolymer with the radical generator by adding the radical generator to the conjugated diene polymer, and kneading the mixture.

3. The method for producing a latex composition according to claim 1, wherein the modification step comprises contacting the conjugated diene copolymer in a solid form with the radical generator.

4. The method for producing a latex composition according to claim 1, wherein in the emulsification step, the emulsification of the modified conjugated diene polymer in water is performed using alkaline water.

5. The method for producing a latex composition according to claim 1, wherein in the emulsification step, the emulsification of the modified conjugated diene polymer in water is performed using 0.01 to 5 parts by weight of a surfactant with respect to 100 parts by weight of the modified conjugated diene polymer.

6. The method for producing a latex composition according to claim 1, wherein in the modification step, the modified conjugated diene polymer is obtained by contacting the conjugated diene polymer with the radical generator in the presence of an acid group-containing compound and/or an acid anhydride.

7. The method for producing a latex composition according to claim 6, wherein in the modification step, the acid group-containing compound and/or the acid anhydride is used in an amount of 0.5 to 15 parts by weight with respect to 100 parts by weight of the conjugated diene polymer.

8. The method for producing a latex composition according to claim 1, wherein the conjugated diene polymer is a synthetic polyisoprene.

9. A method for producing a dip-molded article, comprising steps of:

obtaining a latex composition by the method according to claim 1; and dip molding the latex composition.

* * * * *